(12) United States Patent
Nishimura

(10) Patent No.: US 8,868,127 B2
(45) Date of Patent: Oct. 21, 2014

(54) MOBILE TERMINAL DEVICE, STORAGE MEDIUM AND SOUND OUTPUT CONTROL METHOD

(71) Applicant: KYOCERA Corporation, Kyoto (JP)

(72) Inventor: Yoshihiro Nishimura, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/868,774

(22) Filed: Apr. 23, 2013

(65) Prior Publication Data
US 2013/0281152 A1    Oct. 24, 2013

(30) Foreign Application Priority Data

Apr. 23, 2012  (JP) ................................ 2012-097985

(51) Int. Cl.
| | |
|---|---|
| H04M 1/00 | (2006.01) |
| H04R 25/00 | (2006.01) |
| H04M 1/60 | (2006.01) |
| H04M 1/03 | (2006.01) |
| H04M 19/04 | (2006.01) |
| H04M 1/02 | (2006.01) |
| H04B 1/38 | (2006.01) |

(52) U.S. Cl.
CPC ............. *H04M 1/026* (2013.01); *H04R 25/606* (2013.01); *H04M 1/6016* (2013.01); *H04M 1/03* (2013.01); *H04M 19/04* (2013.01)
USPC ....................................... 455/550.1; 381/151

(58) Field of Classification Search
CPC ................................................... H04R 2460/13
USPC ........................................ 455/550.1; 381/151
See application file for complete search history.

(56) References Cited

U.S. PATENT DOCUMENTS

| 2008/0227501 A1* | 9/2008 | Joo et al. ........................ 455/566 |
| 2013/0051585 A1* | 2/2013 | Karkkainen et al. ........... 381/151 |

FOREIGN PATENT DOCUMENTS

JP        2005-348193 A       12/2005

* cited by examiner

*Primary Examiner* — Lee Nguyen
(74) *Attorney, Agent, or Firm* — Procopio, Cory, Hargreaves & Savitch LLP

(57) ABSTRACT

A mobile terminal device includes: a telephone communication speaker and a control module. The telephone communication speaker includes: a first speaker which releases sound waves corresponding to sounds to be output and vibration waves generated by vibrations of one surface of a housing according to vibrations corresponding to the sounds to be output, thereby to transfer the sounds to a user; and a second speaker which releases sound waves corresponding to sounds to be output. In case of execution of a function to output sounds from the telephone communication speaker, when a predetermined trigger action is not made, the control module executes first control in which the first speaker outputs sounds but the second speaker does not output sounds, and when the trigger action is made, the control module executes second control in which at least the second speaker outputs sounds.

9 Claims, 11 Drawing Sheets

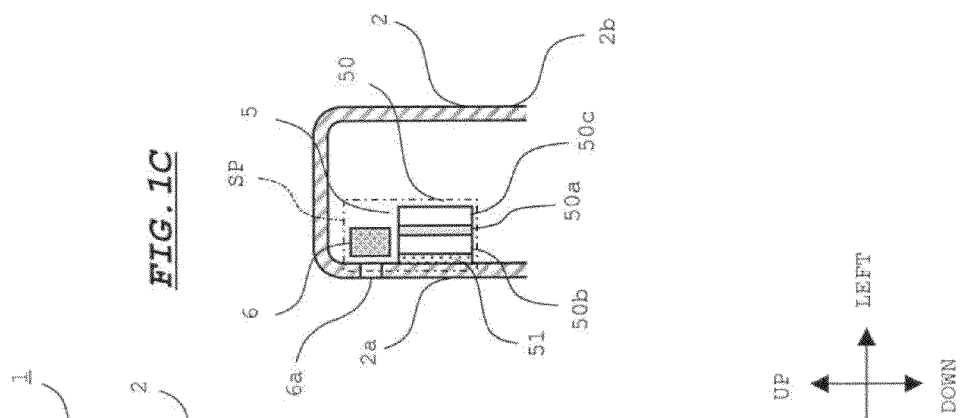
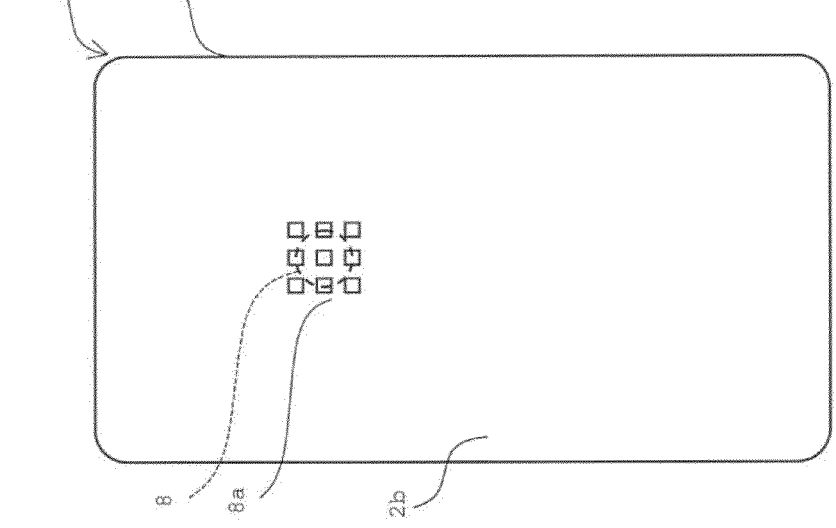
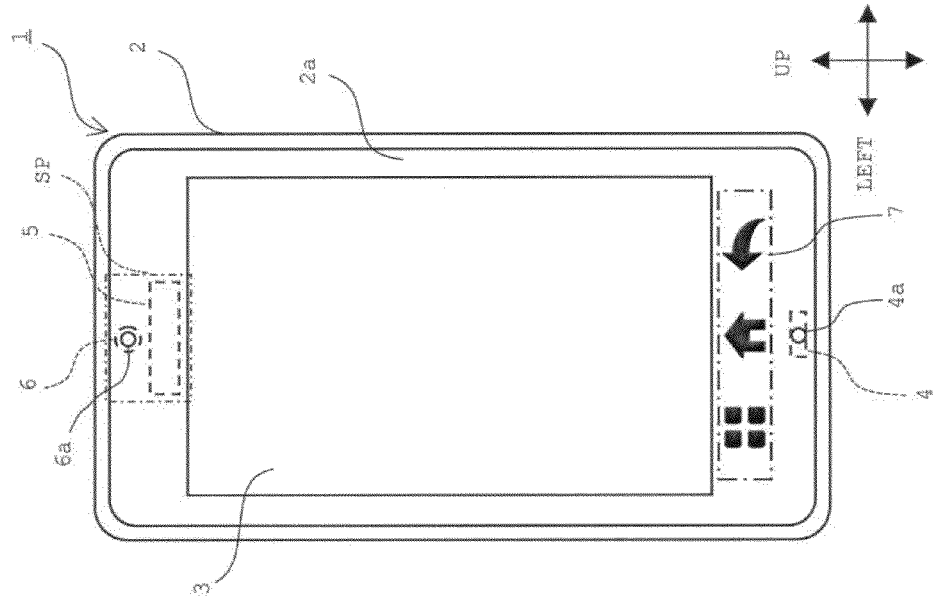

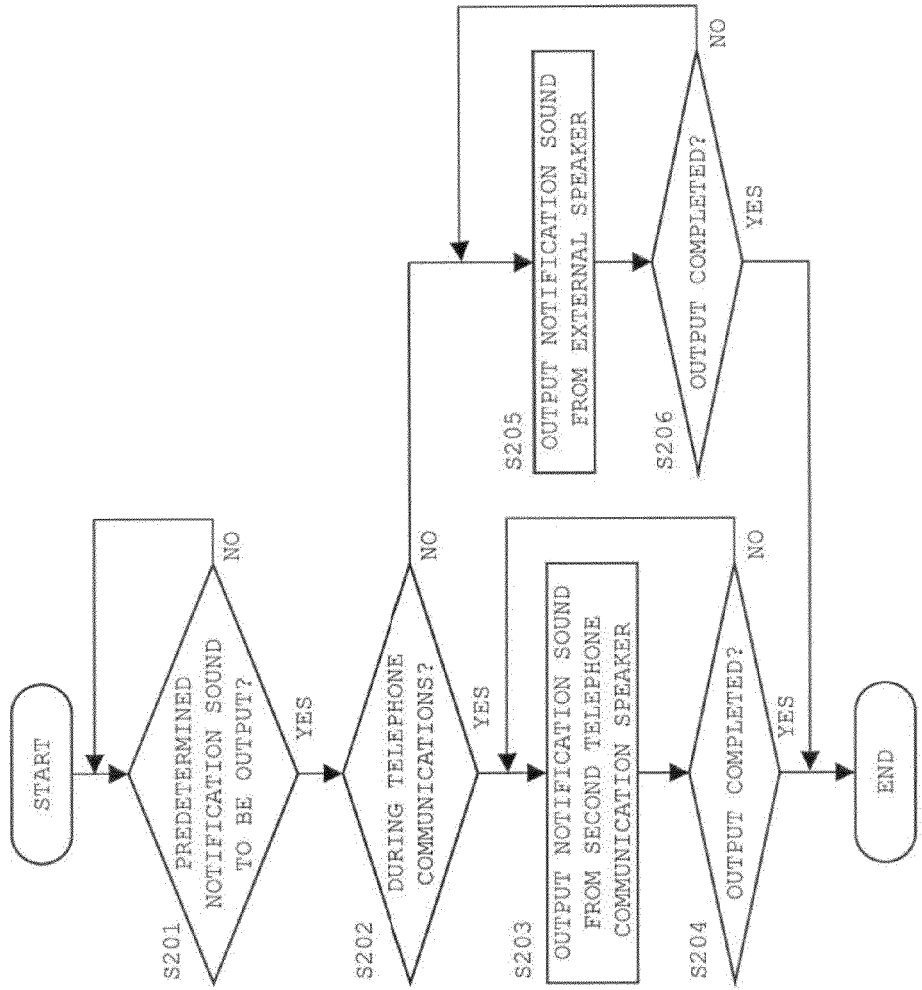
FIG.3B NOTIFICATION SOUND OUTPUT PROCESS
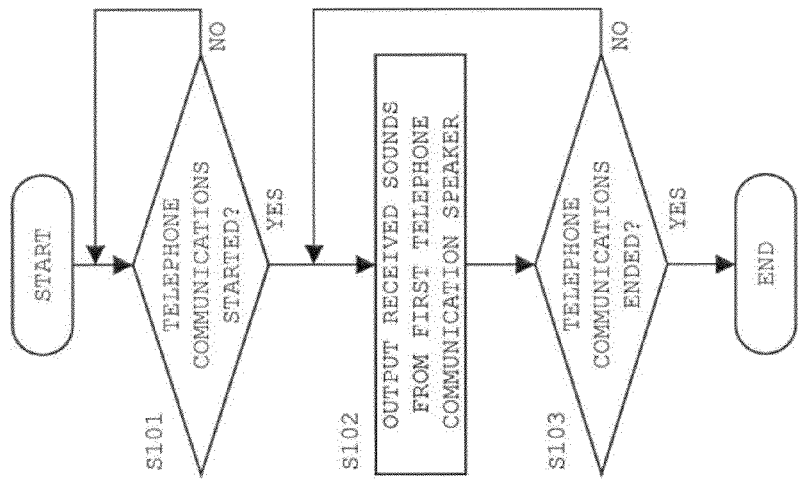
FIG.3A RECEIVED SOUND OUTPUT PROCESS

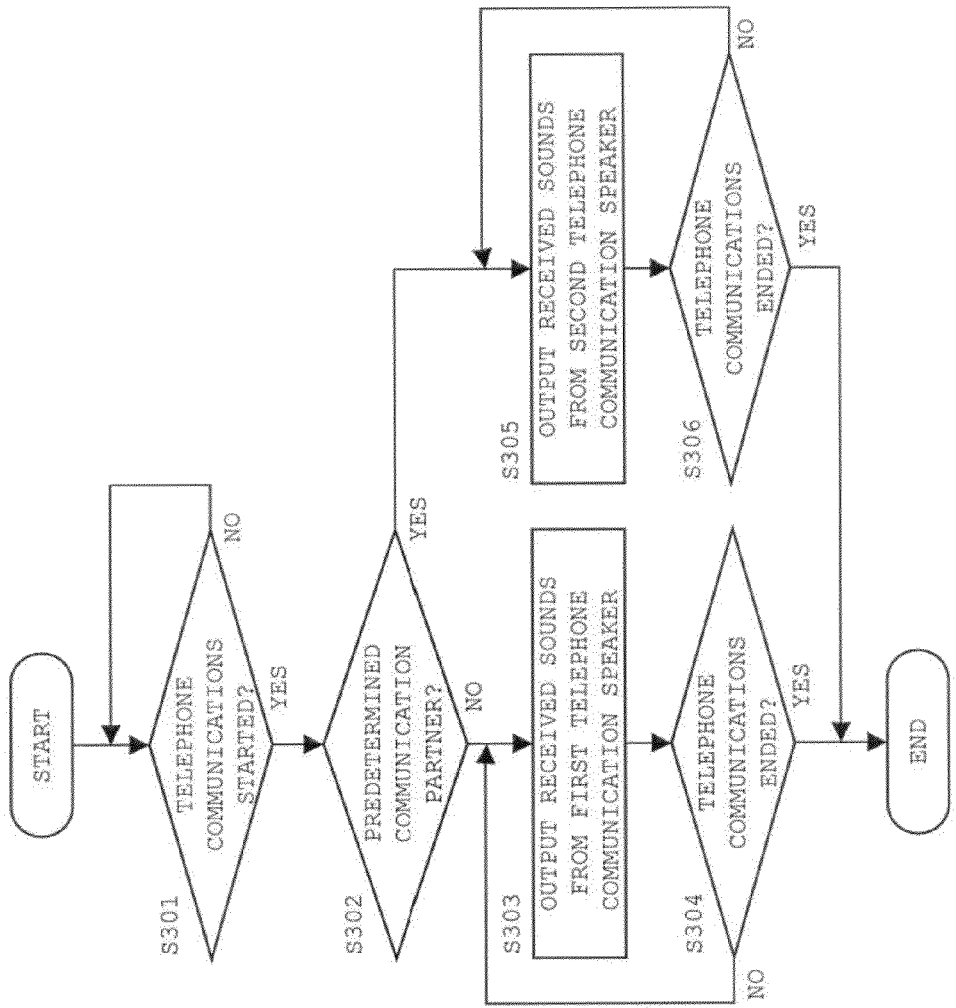

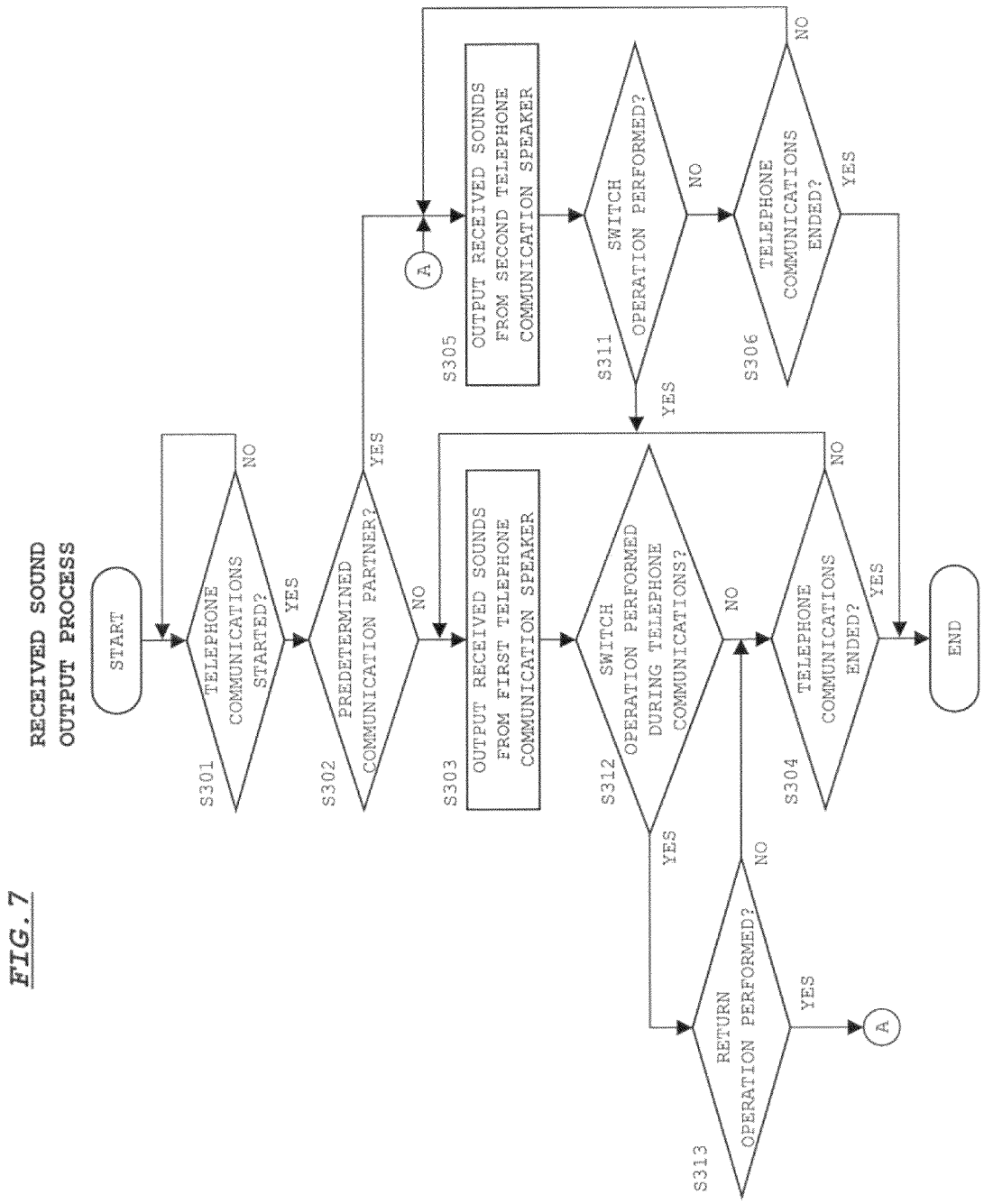

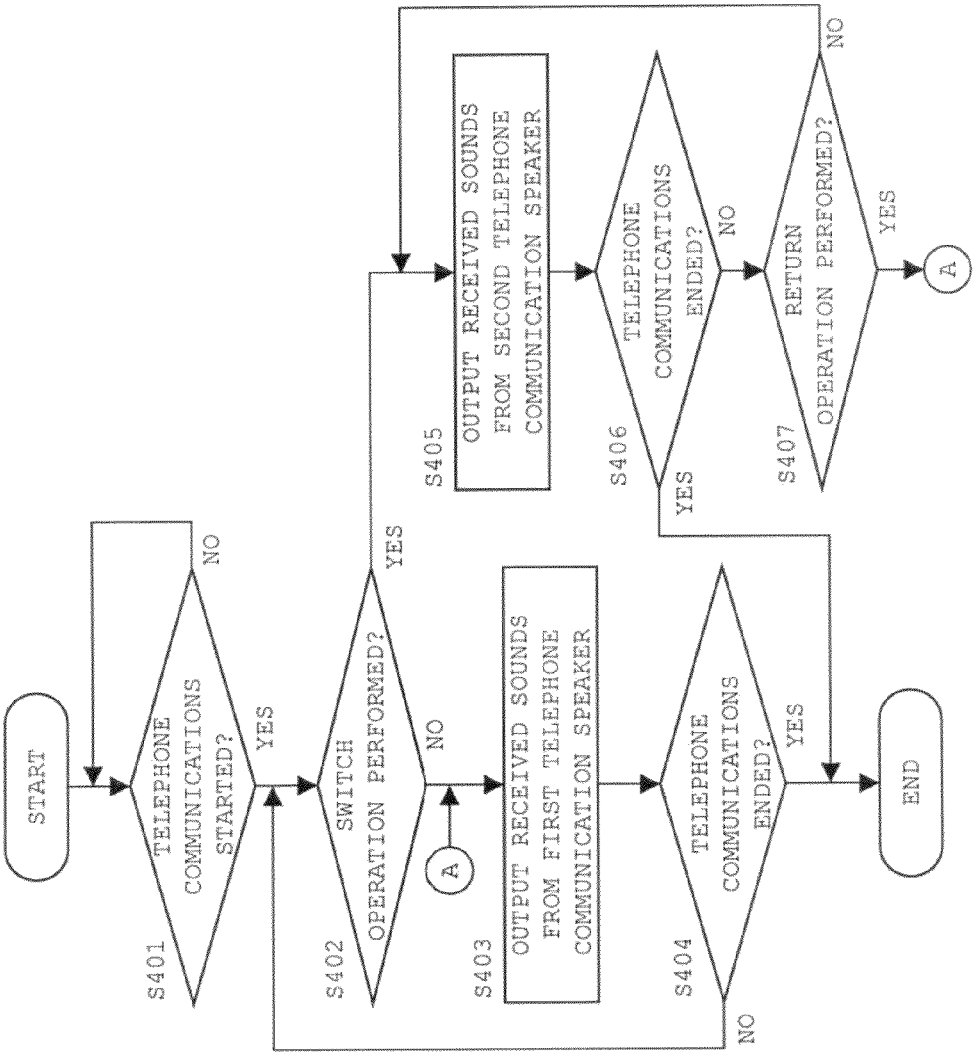

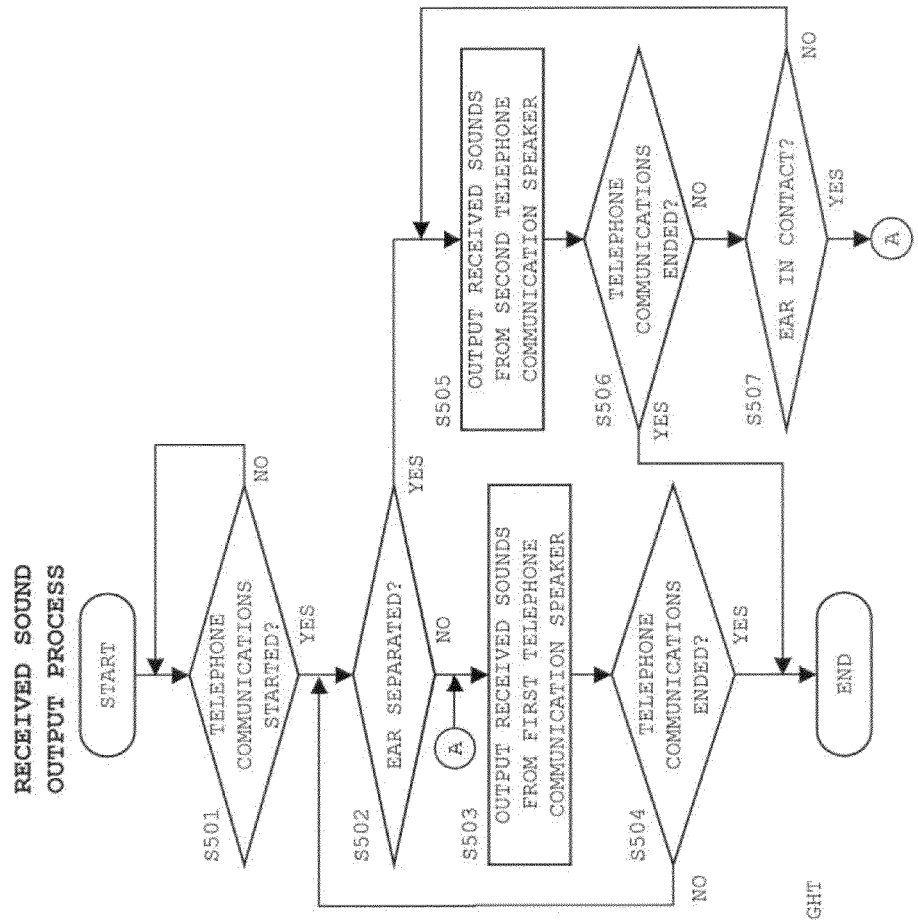
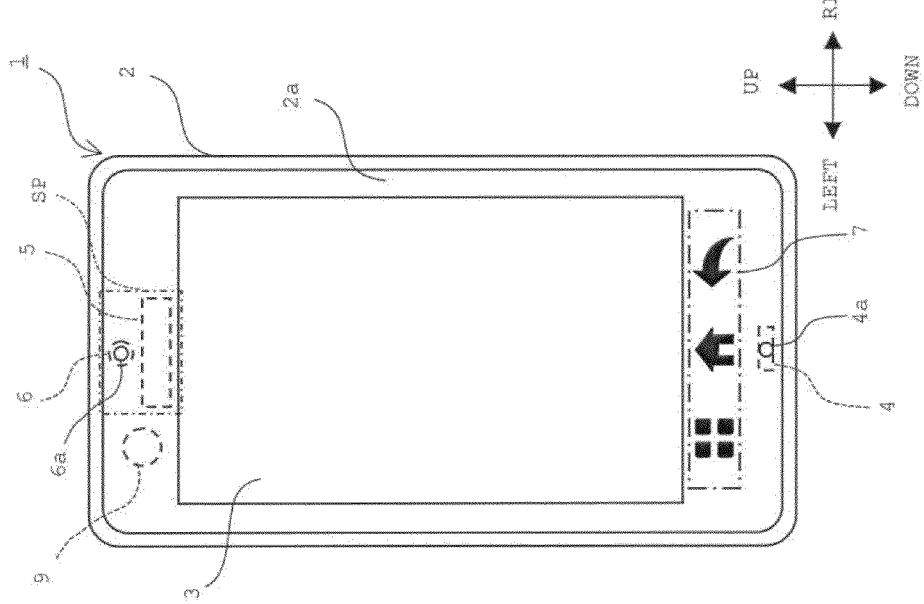

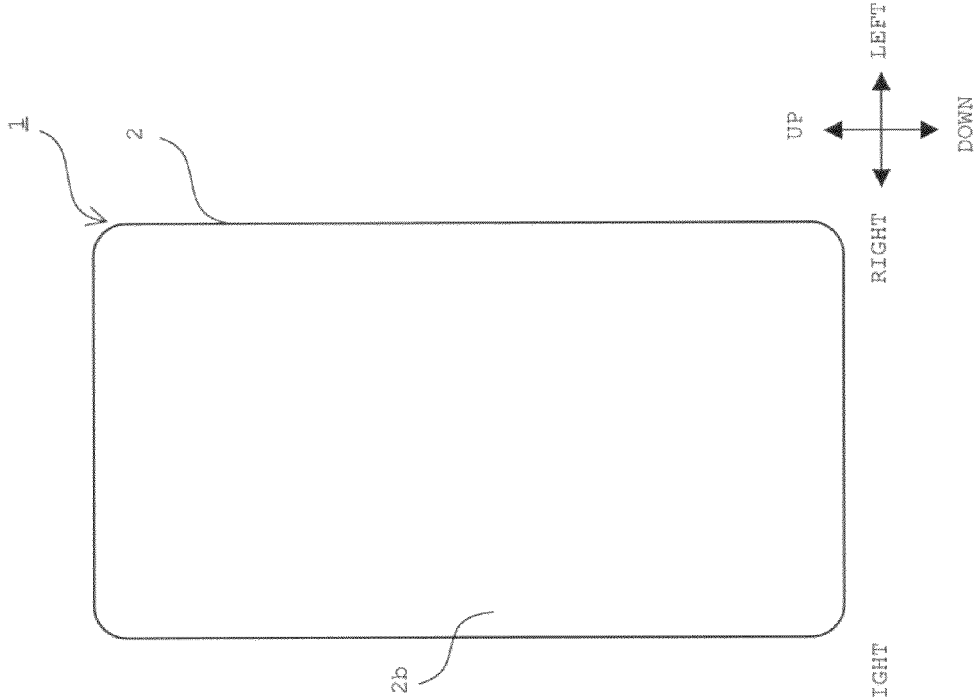
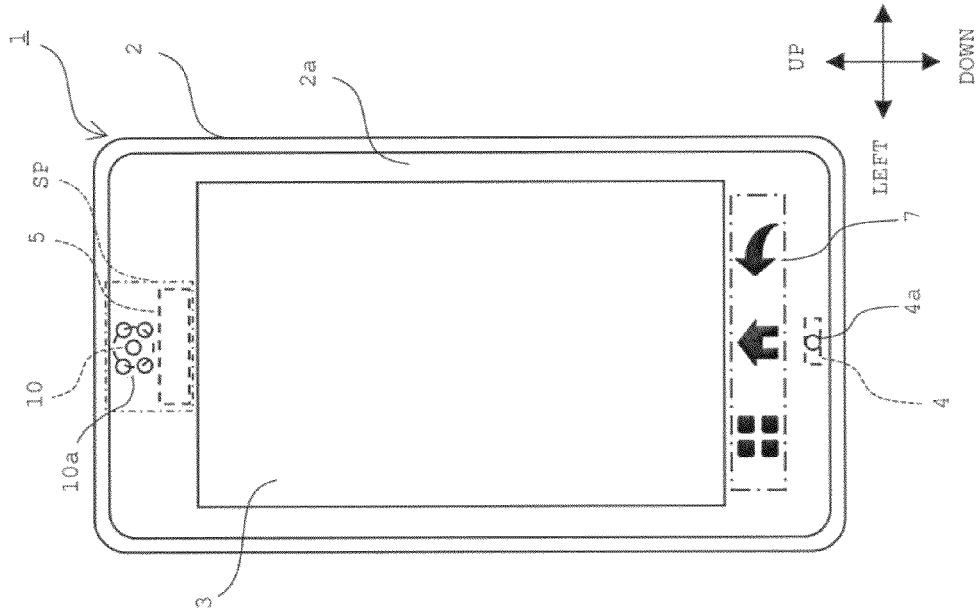

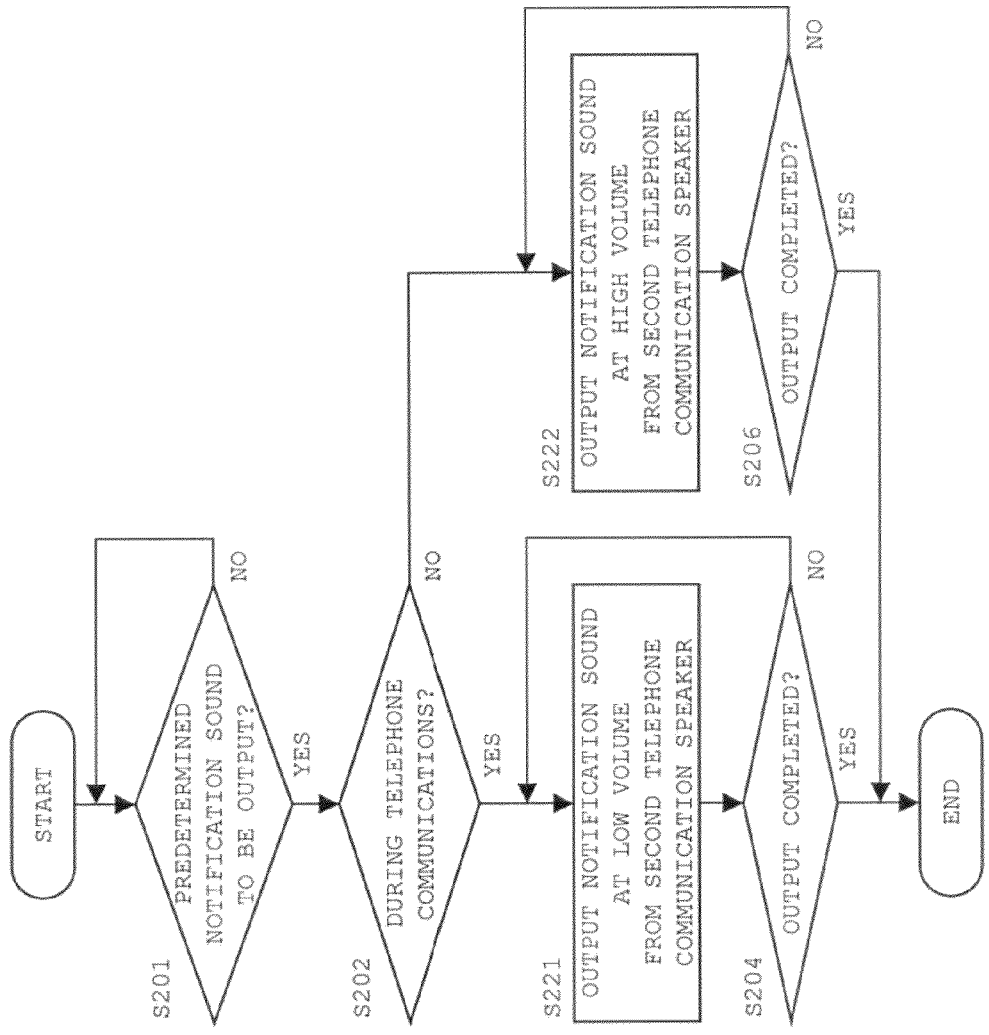

MOBILE TERMINAL DEVICE, STORAGE MEDIUM AND SOUND OUTPUT CONTROL METHOD

This application claims priority under 35 U.S.C. Section 119 of Japanese Patent Application No. 2012-097985 filed on Apr. 23, 2012, entitled "MOBILE TERMINAL DEVICE, PROGRAM, AND SOUND OUTPUT CONTROL METHOD". The disclosure of the above application is incorporated herein by reference.

BACKGROUND OF THE INVENTION

1. Technical Field of the Invention

The present invention relates to mobile terminal devices such as mobile telephones, PDAs (personal digital assistants), tablet PCs, electronic book readers, more specifically to mobile terminal devices including telephone communication functions. In addition, the present invention relates to storage media used in such mobile terminal devices to hold preferred computer programs, and sound output control methods preferably used in the mobile terminal devices.

2. Disclosure of the Related Art

Conventionally, each mobile telephone has a speaker and a microphone for telephone communications on one surface of the device main body. During telephone communications, a user holds the telephone communication speaker close to his/her ear to hear voices from a communication partner.

To provide users with clear sounds, it is conceivable to employ a so-called cartilage-conduction speaker as a speaker for telephone communications on such a mobile telephone.

The cartilage-conduction speaker includes a vibration plate such as a piezoelectric vibration element, and uses the vibration plate to vibrate one surface of the device main body. When a user brings one surface of the device main body into contact with his/her ear, the user's auricular cartilage is vibrated by the vibrations of the one surface, and the vibrations of the auricular cartilage are transferred to his/her eardrum to vibrate the eardrum. Accordingly, the user's brain recognizes sounds.

A mobile telephone with such a cartilage-conduction speaker generates sound waves by vibrations of one surface of the device main body. The user can also recognize sounds by transfer of the sound waves to his/her eardrum. However, the sound pressure of generated sound waves is low at the cartilage-conduction speaker.

When a mobile telephone includes a cartilage-conduction speaker, the user can hear clear sounds by holding the device main body in contact with his/her ear. However, it is not easy for the user to hold the device naturally in constant contact with his/her ear during telephone communications. When the device main body is separated from his/her ear, transfer of sounds via the auricular cartilage is interrupted. Although sounds are transferred by sound waves, the user cannot easily hear the sounds due to a low sound pressure.

Depending on sound information obtained during telephone communications, in some cases, it is more undesired that transfer of sounds is interrupted due to separation of the device main body from a user's ear.

SUMMARY OF THE INVENTION

A mobile terminal device according to a first aspect of the present invention includes: a housing; a telephone communication speaker which outputs sounds during telephone communications; and a control module which controls output of the telephone communication speaker. The telephone communication speaker includes: a first speaker which releases sound waves corresponding to sounds to be output and vibration waves generated by vibrations of one surface of the housing according to vibrations corresponding to the sounds to be output, thereby to transfer the sounds; and a second speaker which releases sound waves corresponding to sounds to be output. In this arrangement, in case of execution of a function to output sounds from the telephone communication speaker, when a predetermined trigger action is not made, the control module executes first control in which the first speaker outputs sounds but the second speaker does not output sounds, and when the trigger action is made, the control module executes second control in which at least the second speaker outputs sounds.

A second aspect of the present invention relates to a storage medium which holds a computer program applied to the mobile terminal device. The mobile terminal device includes: a housing; and a telephone communication speaker which outputs sounds during telephone communications, wherein the telephone communication speaker includes: a first speaker which releases sound waves corresponding to sounds to be output and vibration waves generated by vibrations of one surface of the housing according to vibrations corresponding to the sounds to be output, thereby to transfer the sounds; and a second speaker which releases sound waves corresponding to sounds to be output. The computer program provides a computer of the mobile terminal device with a function to, in case of execution of a function to output sounds from the telephone communication speaker, when a predetermined trigger action is not made, execute first control in which the first speaker outputs sounds but the second speaker does not output sounds, and when the trigger action is made, execute second control in which at least the second speaker outputs sounds.

A third aspect of the present invention relates to a sound output control method for a mobile terminal device including: a housing; and a telephone communication speaker which outputs sounds during telephone communications, the telephone communication speaker including: a first speaker which releases sound waves corresponding to sounds to be output and vibration waves generated by vibrations of one surface of the housing according to vibrations corresponding to the sounds to be output, thereby to transfer the sounds; and a second speaker which releases sound waves corresponding to sounds to be output. The sound output control method according to this aspect includes the steps of: executing a function to output sounds from the telephone communication speaker; and in case of execution of the function, when a predetermined trigger action is not made, executing first control in which the first speaker outputs sounds but the second speaker does not output sounds, and when the trigger action is made, executing second control in which at least the second speaker outputs sounds.

BRIEF DESCRIPTION OF THE DRAWINGS

The foregoing and other objectives and novel features of the present invention will be more fully understood from the following description of preferred embodiments when reference is made to the accompanying drawings.

FIGS. 1A to 1C are diagrams showing a configuration of a mobile telephone according to a first embodiment;

FIG. 3A is a flowchart of a received sound output process according to the first embodiment; and FIG. 3B is a flowchart of a notification sound output process according to the first embodiment;

FIG. 6 is a flowchart of a received sound output process according to a second embodiment;

FIG. 7 is a flowchart of a received sound output process according to a modification example of the second embodiment;

FIG. 8 is a flowchart of a received sound output process according to a third embodiment;

FIG. 9A is a diagram showing a configuration of a mobile telephone according to a fourth embodiment, and FIG. 9B is a flowchart of a received sound output process according to the fourth embodiment;

FIGS. 10A and 10B are diagrams showing a configuration of a mobile telephone according to another modification example; and FIG. 11 is a flowchart of a notification sound output process according to another modification example.

Figure 2:
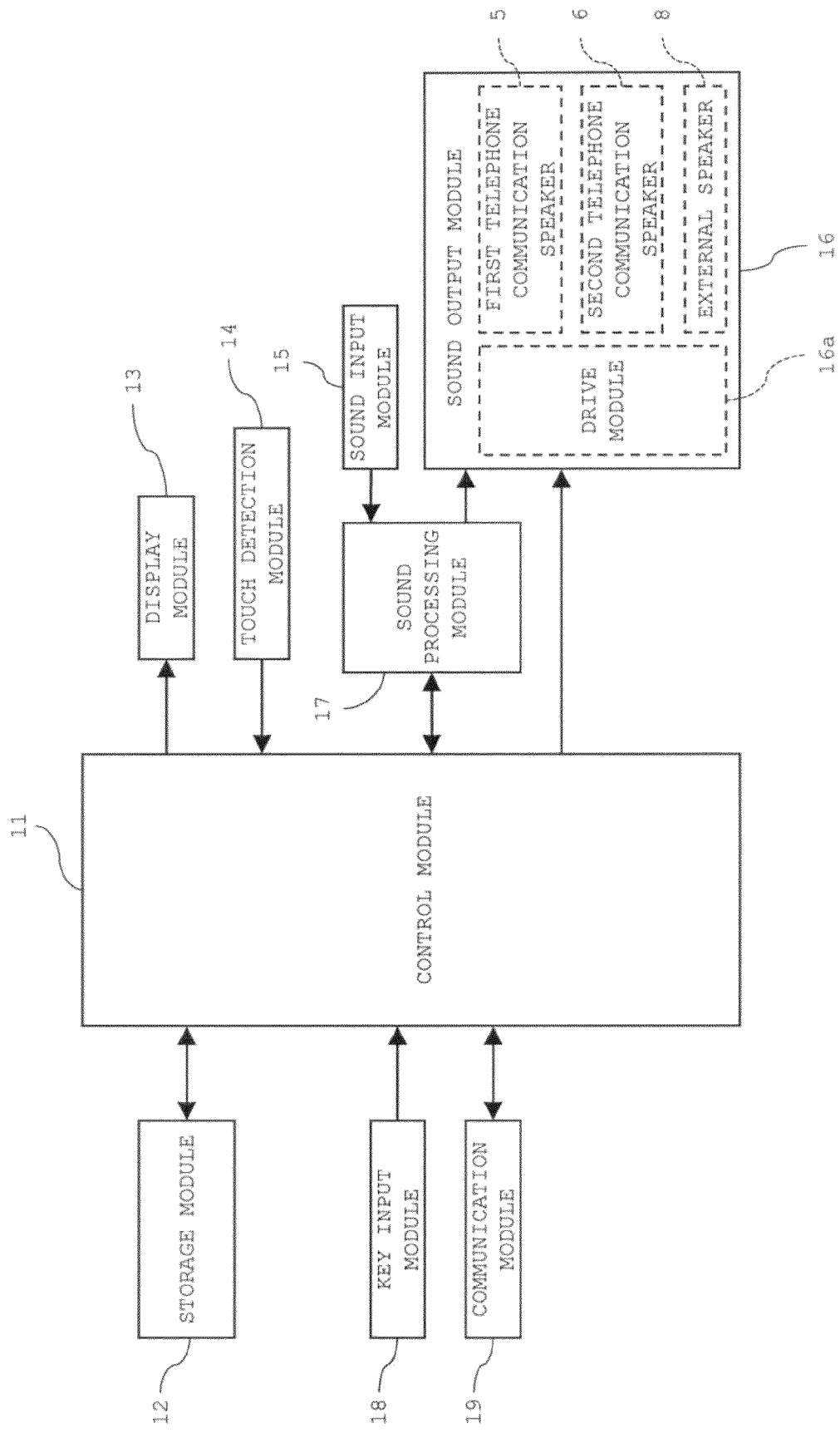
FIG. 2 is a block diagram showing an entire configuration of the mobile telephone according to the first embodiment.

However, the drawings are intended only for illustration and do not limit the scope of the present invention.

DESCRIPTION OF PREFERRED EMBODIMENTS

Embodiments of the present invention will be described with reference to the drawings.

In the embodiments, a cabinet 2 corresponds to a "housing" described in the claims. A front surface 2a corresponds to "one surface of the housing" described in the claims. A telephone communication speaker module SP corresponds to a "telephone communication speaker" described in the claims. A first telephone communication speaker 5 corresponds to a "first speaker" described in the claims. A second telephone communication speaker 6 corresponds to a "second speaker" described in the claims. A key operation part 7 corresponds to a "first control switch operation module" and a "second control switch operation module" described in the claims. A proximity sensor 9 corresponds to a "proximity detection module" described in the claims. However, the foregoing correspondences between the claims and the description of the embodiments are merely examples, and do not limit the claims to the embodiments.

First Embodiment

FIGS. 1A to 1C are diagrams showing a configuration of a mobile telephone 1. FIGS. 1A and 1B are a front view and a back view of the mobile telephone 1, respectively. FIG. 1C is a partial cross-sectional view of the cabinet 2 showing a configuration of a telephone communication speaker module SP.

In the following description, for the sake of convenience, a longer side of the cabinet 2 is defined as a vertical side, and a shorter side of the cabinet 2 is defined as a horizontal side, as shown in FIGS. 1A and 1B.

The mobile telephone 1 includes the cabinet 2, a display surface 3, a microphone 4, the telephone communication speaker module SP (a first telephone communication speaker 5 and a second telephone communication speaker 6), a key operation part 7, and an external speaker 8.

The cabinet 2 has an almost rectangular outline as viewed from the front side. The cabinet 2 includes on a front surface 2a thereof a display surface 3 of a display module described later. That is, the front surface 2a of the cabinet 2 is formed by the display surface 3 and a frame surrounding the display surface 3. Various images (screens) are displayed on the display surface 3.

The cabinet 2 contains the microphone 4 at a lower end part thereof and the telephone communication speaker module SP at an upper end part thereof. The telephone communication speaker module SP is formed by a first telephone communication speaker 5 and a second telephone communication speaker 6, and mainly outputs sounds received from a communication partner during telephone communications.

The cabinet 2 has on the front surface 2a thereof a microphone hole 4a at a position corresponding to the microphone 4. Sounds taken in from the microphone hole 4a are input into the microphone 4. The microphone 4 generates an electrical signal according to the input sounds.

As shown in FIG. 1C, the first telephone communication speaker 5 is a so-called cartilage-conduction speaker, and may include a piezoelectric vibration element 50, for example. The piezoelectric vibration element 50 has a bimorph structure with a shim material 50a, a first piezoelectric ceramic plate 50b, and a second piezoelectric ceramic plate 50c. The first piezoelectric ceramic plate 50b is attached to one side of the shim material 50a and the second piezoelectric ceramic plate 50c is attached to the other side of the shim material 50a.

AC voltages are applied to the first piezoelectric ceramic plate 50b and the second piezoelectric ceramic plate 50c. The AC voltage applied to the first piezoelectric ceramic plate 50b and the AC voltage applied to the second piezoelectric ceramic plate 50c are phase-shifted from each other by 180 degrees. With the application of these AC voltages, an operation of extending the first piezoelectric ceramic plate 50b and shrinking the second piezoelectric ceramic plate 50c and an operation of shrinking the first piezoelectric ceramic plate 50b and extending the second piezoelectric ceramic plate 50c are repeatedly performed to vibrate the piezoelectric vibration element 50.

The piezoelectric vibration element 50 is attached by an adhesive 51 to an inner side of the front surface 2a of the cabinet 2.

The piezoelectric vibration element 50 vibrates according to electric signals corresponding to sounds. When the piezoelectric vibration element 50 vibrates, the vibrations corresponding to the sounds are transferred to the front surface 2a of the cabinet 2, thereby to vibrate the front surface 2a. When a user puts the front surface 2a of the cabinet 2 to his/her ear, that is, when the user holds his/her ear close to the front surface 2a or brings his/her ear into contact with the front surface 2a, sound waves generated by vibrations of the cabinet 2 enter into the ear canal through the ear canal hole. The incoming sound waves move in the ear canal and vibrate the ear drum. Accordingly, the user's brain recognizes the sounds. Further, when the user bring his/her ear into contact with the front surface 2a of the cabinet 2, the auricular cartilage vibrates according to vibrations of the cabinet 2, and the vibrations of the auricular cartilage are transferred to the ear drum, thereby to vibrate the ear drum. Accordingly, the user's brain recognizes the sounds.

The first telephone communication speaker 5, that is, the piezoelectric vibration element 50 may not be attached to a back surface of a frame above the display surface 3, unlike in the foregoing description, but may be attached to the back surface of the display module 13.

The second telephone communication speaker 6 is a so-called air-conduction speaker. The second telephone communication speaker 6 outputs sound waves corresponding to sounds. The cabinet 2 has on the front surface 2a thereof a sound outlet 6a corresponding to the second telephone communication speaker 6. The sound outlet 6a is formed by one hole. The sounds, that is, the sound waves output from the second telephone communication speaker 6 are released to the outside via the sound outlet 6a. When the user puts the front surface 2a of the cabinet 2 to his/her ear, the sound waves released from the sound outlet 6a enter into the ear canal through the ear canal hole, thereby to vibrate the eardrum. Accordingly, the user's brain recognizes sounds.

As described above, in the first telephone communication speaker 5 (the piezoelectric vibration element 50), the cabinet 2 vibrates and generates sound waves, and thus the user can hear sounds even when the cabinet 2 is separated from the user's ear. However, sound waves generated by vibrations of the cabinet 2 are smaller in sound pressure than sound waves output from the second telephone communication speaker 6. Accordingly, sounds transferred from the first telephone communication speaker 5 to the user's ear are significantly smaller than sounds from the second telephone communication speaker 6.

Specifically, sounds from the first telephone communication speaker 5 are less likely to leak to the surroundings than sounds from the second telephone communication speaker 6. On the other hand, when the user releases the cabinet 2 from his/her ear, the user can less easily hear sounds from the first telephone communication speaker 5 than sounds from the second telephone communication speaker 6. Meanwhile, sounds from the second telephone communication speaker 6 are more likely to leak to the surroundings than sounds from the first telephone communication speaker 5. On the other hand, even when the user releases the cabinet 2 from his/her ear, the user can more easily hear sounds from the second telephone communication speaker 6 than sounds from the first telephone communication speaker 5.

The cabinet 2 includes a key operation part 7 on the front surface 2a. The key operation part 7 includes a plurality of operation keys. The operation keys are assigned various functions according to a program under execution or the like.

The cabinet 2 contains an external speaker 8. The external speaker 8 is an air-conduction speaker as with the second telephone communication speaker 6. The cabinet 2 has on the back surface 2b thereof a sound outlet 8a corresponding to the external speaker 8. The sound outlet 8a is formed by a plurality of holes. Sounds output from the external speaker 8 (voices, notification sounds, and the like), that is, sound waves are released to the outside via the sound outlet 8a.

FIG. 2 is a block diagram of an entire configuration of the mobile telephone 1. The mobile telephone 1 includes a control module 11, a storage module 12, a display module 13, a touch detection module 14, a sound input module 15, a sound output module 16, a sound processing module 17, a key input module 18, and a communication module 19.

The storage module 12 includes a ROM, a RAM, and the like. The storage module 12 stores various programs. The programs stored in the storage module 12 include control programs for controlling components of the mobile telephone 1 and various applications (for telephone, e-mail, map, game, schedule management, for example).

The storage module 12 is also used as a working area for storing data temporarily used or generated at execution of a program.

The control module 11 includes a CPU and the like. The control module 11 controls components (the storage module 12, the display module 13, the touch detection module 14, the sound input module 15, the sound output module 16, the sound processing module 17, the key input module 18, the communication module 19, and others) constituting the mobile telephone 1 according to the programs.

The display module 13 includes a liquid crystal display and the like. The display module 13 displays an image (screen) on the display surface 3 according to a control signal and an image signal from the control module 11. The display module 13 may include any other display device such as an organic EL display in place of the liquid crystal display.

The touch detection module 14 includes a touch panel and the like for detecting contact with the display surface 3 by a finger, a touch pen, or the like (hereinafter, referred simply to as "finger"). The touch panel is formed into a transparent sheet and is disposed on the front surface 2a of the cabinet 2 so as to cover the display surface 3. The touch panel may be any of touch panels of various types such as an electric capacity type, an ultrasonic wave type, a pressure sensitive type, a resistance film type, and a photo detective type.

The touch detection module 14 detects touch on the display surface 3 by a user. Specifically, the touch detection module 14 detects a position on the display surface 3 contacted by a finger as an input position, and outputs a position signal corresponding to the detected input position to the control module 11.

The user can perform various touch operations by touching the display surface 3 by a finger. The touch operations include a tap operation, a flick operation, a slide operation, and the like. The tap operation is performed by touching the display surface 3 by a finger and then releasing the finger in a short time. The flick operation is performed by flipping the display surface 3 by a finger in an arbitrary direction. The slide operation is performed by touching and holding the display surface 3 by a finger and moving the finger in an arbitrary direction.

For example, the mobile telephone 1 replies to an incoming call or initiates a call to a specific communication partner according to touch operations by the user. More specifically, when the touch detection module 14 detects a touch operation performed on an icon (also referred to a minified image) corresponding to a reply to an incoming call that is displayed on the display surface 3 or on an icon corresponding to execution of initiating a call that is displayed on the display surface 3, the control module 11 having received the result of the detection executes a process for receiving an incoming call or initiating a call.

The sound input module 15 includes the microphone 4 and the like. The sound input module 15 outputs electric signals from the microphone 4 to the sound processing module 17.

The sound output module 16 includes the first telephone communication speaker 5, the second telephone communication speaker 6, the external speaker 8, a drive module 16a, and the like. An electric signal from a sound processing module 17 is input into the sound output module 16. Based on the input electrical signal, the drive module 16a drives the first telephone communication speaker 5, the second telephone communication speaker 6, or the external speaker 8, according to a control signal from the control module 11. Accordingly, the first telephone communication speaker 5, the second telephone communication speaker 6, or the external speaker 8 outputs sounds (voices, notification sounds, and the like).

The sound processing module 17 subjects an electric signal from the sound input module 15 to A/D conversion and the like, and outputs a converted digital sound signal to the control module 11. The sound processing module 17 subjects the digital sound signal from the control module 11 to a decoding process and D/A conversion and the like, and outputs a converted electric signal to the sound output module 16.

When any of the operation keys in the key operation part is pressed, the key input module 18 outputs a signal corresponding to the pressed operation key to the control module 11. The operation keys include an operation key for the mobile telephone 1 to start communications when pressed by the user on arrival of an incoming call, and an operation key for the mobile telephone 1 to initiate a call to a specific communication partner when pressed by the user.

To perform telephone calls and data communications, the communication module 19 includes a circuit for signal conversion, an antenna for radio wave transmission/reception, and the like. The communication module 19 converts a signal for telephone calls or data communications input from the control module 11 into a radio signal, and transmits the converted radio signal via the antenna to a base station or another communication device or the like as a destination of communications. The communication module 19 also converts radio signals received via the antenna into a signal in a form capable of being used by the control module 11, and outputs the converted signal to the control module 11.

In this embodiment, when an icon corresponding to a telephone application is operated, or when an incoming call from another mobile telephone or the like has arrived, the telephone application is executed. The telephone application is one of functions of the mobile telephone 1 in which sounds are output from the telephone communication speaker module SP.

When a communication partner or the user starts telephone communications by performing an operation for starting telephone communications, sounds received from the communication partner are output from the telephone communication speaker module SP according to a received sound output process described later during the telephone communications. Further, predetermined notification sound(s) to be output during the telephone communications are output from the telephone communication speaker module SP according to a notification sound output process described later.

FIG. 3A is a flowchart of the received sound output process. When the telephone application is executed, the received sound output process is started.

The control module 11 determines whether telephone communications are started (S101). When telephone communications are started (S101: YES), the control module 11 sends sound signals corresponding to sounds received by the communication module 19 to the sound output module 16 via the sound processing module 17, and controls the drive module 16a to output the received sounds from the first telephone communication speaker 5 (S102). The control module 11 does not cause the second telephone communication speaker 6 to output the received sounds.

When the telephone communications are ended by an operation for terminating telephone communications (S103: YES), the control module 11 terminates the received sound output process.

FIG. 3B is a flowchart of the notification sound output process.

The storage module 12 stores predetermined notification sounds to be output in the notification sound output process. The predetermined notification sounds include an alarm sound to be output at a time set by the user, an alert sound to be output at a low battery charge, an alert sound to be output on arrival of an emergency announcement, and the like, for example. These notification sounds are sound information the user does not wish to fail to miss as much as possible.

When the mobile telephone 1 is activated, the notification sound output process is started. During operation of the mobile telephone 1, the notification sound output process is repeatedly executed.

The control module 11 determines whether a timing for outputting a predetermined notification sound has come (S201). In the case the notification sound is an alarm sound for notifying the coming of a set time, the timing for outputting the notification sound falls on the coming of the set time. In the case the notification sound is an alert sound for an emergency announcement, the timing for outputting the notification sound falls on the arrival of the emergency announcement.

When determining that the output timing has come (S201: YES), the control module 11 further determines whether telephone communications are currently being performed (S202). When telephone communications are being performed (S202: YES), the control module 11 sends a sound signal corresponding to the notification sound to the sound output module 16 via the sound processing module 17, and controls the drive module 16a to output the notification sound from the second telephone communication speaker 6 (S203).

When a timing for terminating output of the notification sound has come, for example, when a period of time for outputting the notification sound has elapsed (S204: YES), the control module 11 terminates the notification sound output process.

When determining at step S202 that no telephone communications are being performed (S202: NO), the control module 11 causes the external speaker 8 to output the notification sound (S205). When the timing for terminating output of the notification sound has come (S206: YES), the control module 11 terminates the notification sound output process.

Even when the notification sound is output from the second telephone communication speaker 6 during telephone communications, the control module 11 causes the first telephone communication speaker 5 to output sounds received by the communication module 19, according to the received sound output process shown in FIG. 3A.

As described above, according to this embodiment, the first telephone communication speaker 5 outputs received sounds, and thus the user can hear clear received sounds by holding the cabinet 2 in contact with his/her ear without great influence of surrounding noise and the like. Further, it is possible to suppress leakage of received sounds to the surroundings.

Further, according to this embodiment, the second telephone communication speaker 6 outputs predetermined notification sounds the user does not wish to fail to miss, and thus the user can sufficiently hear the predetermined notification sounds even with the cabinet 2 separated from his/her ear.

<Modification Example 1 of the First Embodiment>

Figure 4:
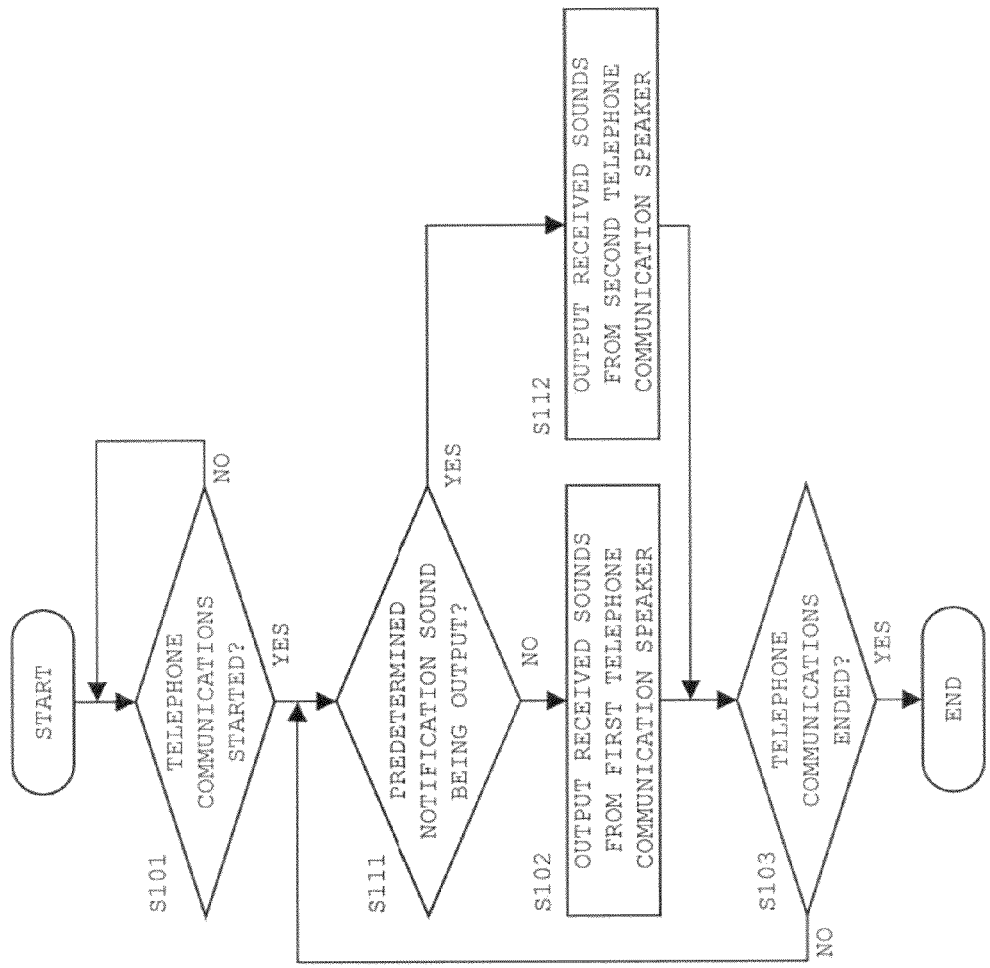
FIG. 4 is a flowchart of a received sound output process according to a modification example 1 of the first embodiment.

FIG. 4 is a flowchart of a received sound output process according to a modification example 1.

As in this modification example, in the mobile telephone 1 of the present invention, when a predetermined notification sound is output, the destination of output of received sounds may be switched from the first telephone communication speaker 5 to the second telephone communication speaker 6, such that the first telephone communication speaker 5 does not output sounds.

In this modification example, steps S111 and S112 are added to the notification sound output process in the first embodiment. The additional steps will be described below.

The control module 11 determines whether a predetermined notification sound is output during telephone communications (S111). When no predetermined notification sound is output (S111: NO), the control module 11 causes the first telephone communication speaker 5 to output received sounds (S102).

When the first telephone communication speaker 5 starts to output a predetermined notification sound (S111: YES), the control module 11 causes the second telephone communication speaker 6 to output received sounds (S112). The second telephone communication speaker 6 outputs a predetermined notification sound and received sounds. When output of the predetermined notification sound is completed (S111: NO), the control module 11 causes again the first telephone communication speaker 5 to output received sounds (S102).

<Modification Example 2 of the First Embodiment>

Figure 5:
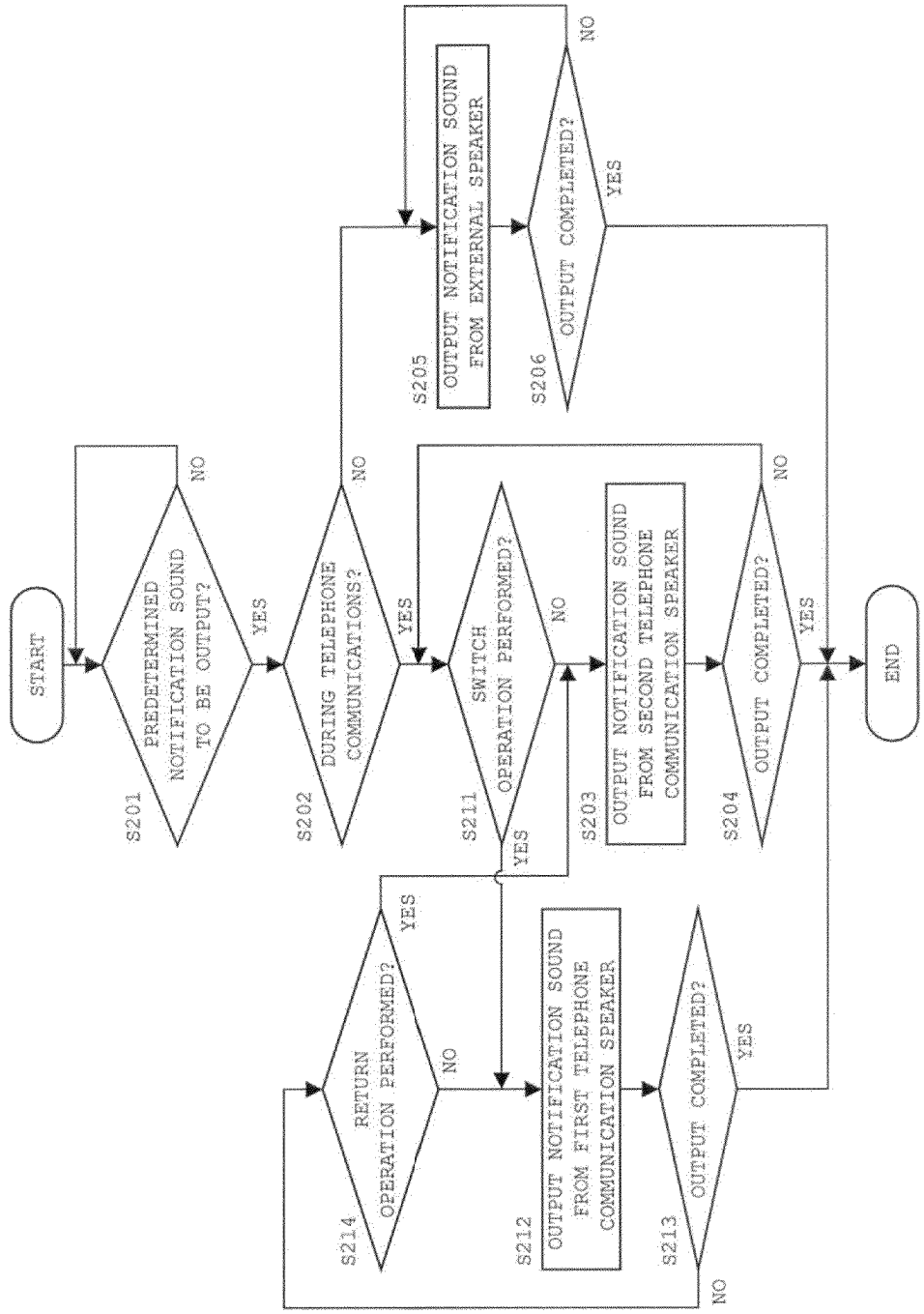
FIG. 5 is a flowchart of a notification sound output process according to a modification example 2 of the first embodiment.

FIG. 5 is a flowchart of a notification sound output process according to a modification example 2.

In this modification example, steps S211 to S214 are added to the notification sound output process in the first embodiment. The additional steps will be described below.

When a timing for outputting a predetermined notification sound has come during telephone communications (S202: YES), the control module 11 determines whether a switch operation for switching the destination of output of the predetermined notification sound from the second telephone communication speaker 6 to the first telephone communication speaker 5 (equivalent to the switch operation from the second control to the first control in the present invention) is performed (S211). For example, one operation key in the key operation part 7 is assigned to the switch operation.

As described above, sounds from the second telephone communication speaker 6 are more likely to leak to the surroundings than sounds from the first telephone communication speaker 5. When it is desired to suppress leakage of a notification sound to the surroundings, for example, the user performs the switch operation.

When determining that the switch operation is performed (S211: YES), the control module 11 causes the first telephone communication speaker 5 to output the notification sound (S212).

While the timing for terminating output of the notification sound has not come (S213: NO), the control module 11 determines whether a return operation for returning the destination of output of a predetermined notification sound from the first telephone communication speaker 5 to the second telephone communication speaker 6 is performed (S214). For example, one operation key in the key operation part 7 is assigned to the return operation. The operation key assigned to the return operation may be the same as or different from the operation key assigned to the switch operation.

When determining that the return operation is performed (S214: YES), the control module 11 causes the second telephone communication speaker 6 to output the notification sound (S203).

As described above, according to this modification example, the user can switch the destination of output of the notification sound from the second telephone communication speaker 6 to the first telephone communication speaker 5 according to the conditions of the surroundings. This improves the mobile telephone 1 in user convenience.

Second Embodiment

In this embodiment, during telephone communications with a predetermined communication partner, received sounds are output from the second telephone communication speaker 6.

The storage module 12 stores information indicative of predetermined communication partners, for example, telephone numbers. The predetermined communication partners can be stored in the storage module 12 by the user performing a registration operation in advance on a predetermined setting screen. For example, as predetermined telephone communication partners, the user registers communication partners from which the user does not wish to cause received sounds to be interrupted, such as business partners.

FIG. 6 is a flowchart of a received sound output process. Configurations in this embodiment other than a configuration of the received sound output process are identical to those in the first embodiment.

When telephone communications are started (S301: YES), the control module 11 compares the telephone number of the current communication partner with the telephone numbers stored in the storage module 12, for example, thereby to determine whether the current communication partner is a predetermined communication partner (S302).

When the current communication partner is not a predetermined communication partner (S302: NO), the control module 11 causes the first telephone communication speaker 5 to output received sounds (S303). The control module 11 does not cause the second telephone communication speaker 6 to output received sounds. When the telephone communications are ended (S304: YES), the control module 11 terminates the received sound output process.

Meanwhile, when determining that the current communication partner is a predetermined communication partner (S302: YES), the control module 11 causes the second telephone communication speaker 6 to output received sounds (S305). The control module 11 does not cause the first telephone communication speaker 5 to output received sounds. At the end of the telephone communications (S306: YES), the control module 11 terminates the received sound output process.

As described above, according to this embodiment, the first telephone communication speaker 5 outputs sounds received from a communication partner other than predetermined communication partners, and thus the user can hear clear received sounds by holding the cabinet 2 in contact with his/her ear, without large influence of surrounding noise and the like. Further, it is possible to suppress leakage of received sounds to the surroundings.

Further, according to this embodiment, the second telephone communication speaker 6 outputs sounds received from a predetermined telephone communication partner the user does not wish to fail to miss, and thus the user can hear sufficiently sounds received from a predetermined telephone communication partner even with the cabinet 2 separated from his/her ear.

<Modification Example of the Second Embodiment>

FIG. 7 is a flowchart of a received sound output process according to a modification example.

In this embodiment, steps S311 to S313 are added to the received sound output process in the first embodiment. The added steps will be described below.

While the second telephone communication speaker 6 outputs sounds received from a predetermined communication partner, the control module 11 determines whether a switch operation for switching the destination of output of received sounds from the second telephone communication speaker 6 to the first telephone communication speaker 5 (equivalent to the operation for switching from the second control to the first control in the present invention) is performed (S311). For example, one operation key in the key operation part 7 is assigned to the switch operation.

For example, when surrounding noise is large or when leakage of a notification sound to the surroundings is to be suppressed, the user performs the switch operation.

When determining that the switch operation is performed (S311: YES), the control module 11 causes the first telephone communication speaker 5 to output received sounds (S303).

When the destination of output is switched from the second telephone communication speaker 6 to the first telephone communication speaker 5 during telephone communications (S312: YES), the control module 11 determines whether a return operation for returning the destination of output of received sounds from the first telephone communication speaker 5 to the second telephone communication speaker 6 is performed (S313). For example, one operation key in the key operation part 7 is assigned to the return operation.

When determining that the return operation is performed (S313: YES), the control module 11 causes the second telephone communication speaker 6 to output received sounds (S305).

As described above, according to this modification example, the user can switch the destination of output of received sounds from the second telephone communication speaker 6 to the first telephone communication speaker 5 according to the conditions of the surroundings. This improves the mobile telephone 1 in user convenience.

Third Embodiment

In this embodiment, when the switch operation is performed by the user during telephone communications, the second telephone communication speaker 6 outputs received sounds.

FIG. 8 is a flowchart of a received sound output process. Configurations in this embodiment other than a configuration of the received sound output process are identical to those in the first embodiment.

When telephone communications are started (S401: YES), the control module 11 determines whether a switch operation for switching the destination of output of received sounds from the first telephone communication speaker 5 to the second telephone communication speaker 6 (equivalent to the operation for switching from the first control to the second control in the present invention) is performed (S402). For example, one operation key in the key operation part 7 is assigned to the switch operation.

When the switch operation is not performed (S402: NO), the control module 11 causes the first telephone communication speaker 5 to output received sounds (S403). The control module 11 does not cause the second telephone communication speaker 6 to output received sounds. When telephone communications are ended (S404: YES), the control module 11 terminates the received sound output process.

The control module 11 continues monitoring for the switch operation until telephone communications are ended (S402).

For example, the user may possibly perform the switch operation when the user is likely to separate the cabinet 2 from his/her ear and miss received sounds because the user is walking or is tossed in a train or the like. Otherwise, the user may possibly perform the switch operation in the case the contents of telephone communications are important and should not be missed.

When the switch operation is performed (S402: YES), the control module 11 causes the second telephone communication speaker 6 to output received sounds (S405). The control module 11 does not cause the first telephone communication speaker 5 to output received sounds. When telephone communications are ended (S406: YES), the control module 11 terminates the received sound output process.

The control module 11 determines whether the return operation is performed until telephone communications are ended (S407). For example, one operation key in the key operation part 7 is assigned to the return operation.

When determining that the return operation is performed (S407: YES), the control module 11 causes again the first telephone communication speaker 5 to output received sounds (S403).

As described above, according to this embodiment, when the switch operation is not performed, the first telephone communication speaker 5 outputs received sounds, and thus the user can hear clear received sounds by holding the cabinet 2 in contact with his/her ear, without large influence of surrounding noise and the like. Further, it is possible to suppress leakage of received sounds to the surroundings.

Further, according to this embodiment, when the switch operation is performed, the second telephone communication speaker 6 outputs received sounds, and thus the user can sufficiently hear received sounds even with the cabinet 2 separated from his/her ear.

Fourth Embodiment

In this embodiment, when the cabinet 2 is separated from the user's ear during telephone communications, the second telephone communication speaker 6 outputs received sounds.

FIG. 9A is a diagram (front view) showing a configuration of the mobile telephone 1. FIG. 9B is a flowchart of a received sound output process.

In this embodiment, the cabinet 2 has on the upper end part thereof a proximity sensor 9. The proximity sensor 9 is adjusted in sensitivity so as to output a detection signal to the control module 11 when the user's ear contacts a region on the front surface 2a of the cabinet 2 in the vicinity of the proximity sensor 9. The proximity sensor 9 may be disposed at any position on the cabinet 2 as far as the proximity sensor 9 is capable of detecting the presence or absence of contact of the user's ear on the front surface 2a of the cabinet 2.

Upon reception of the detection signal from the proximity sensor 9, the control module 11 determines that the user's ear is in contact with the cabinet 2. When the detection signal disappears, the control module 11 determines that the user's ear is separated from the cabinet 2.

Configurations in this embodiment other than a configuration of the received sound output process are identical to those in the first embodiment.

The received sound output process will be described with reference to FIG. 9B.

When telephone communications are started (S501: YES), the control module 11 determines whether the user's ear is separated from the cabinet 2 (S502). This determination is made when it is detected that the user's ear is in contact with the cabinet 2 for the first time after the telephone communications are started.

When the user's ear is in contact with the cabinet 2 (S502: NO), the control module 11 causes the first telephone communication speaker 5 to output received sounds (S503). The control module 11 does not cause the second telephone communication speaker 6 to output received sounds. When the telephone communications are ended (S504: YES), the control module 11 terminates the received sound output process.

The control module 11 continues to monitor to determine whether the user's ear is separated from the cabinet 2 until the telephone communications are ended (S502).

When detecting that the user's ear is separated from the cabinet 2 (S502: YES), the control module 11 causes the second telephone communication speaker 6 to output received sounds (S505). The control module 11 does not cause the first telephone communication speaker 5 to output received sounds. When the telephone communications are ended (S506: YES), the control module 11 terminates the received sound output process.

The control module 11 determines whether the user's ear contacts the cabinet 2 until the telephone communications are ended (S507).

When determining that the user's ear is in contact with the cabinet 2 (S507:YES), the control module 11 causes again the first telephone communication speaker 5 to output received sounds (S503).

As described above, according to this embodiment, when the user's ear contacts the cabinet 2, the first telephone communication speaker 5 outputs received sounds, and thus the user can hear clear received sounds without large influence of surrounding noise and the like. Further, it is possible to suppress leakage of received sounds to the surroundings.

Further, according to this embodiment, when the user's ear is separated from the cabinet 2, the second telephone communication speaker 6 outputs received sounds, and thus the user can sufficiently hear received sounds even with the cabinet 2 separated from his/her ear.

Others

As in the foregoing, embodiments and modification examples of the present invention are described. However, the present invention is not limited by the foregoing embodiments and the like, and the embodiments of the present invention can also be modified in various manners other than the above-described manners.

For example, the external speaker 8 is provided in the first embodiment. Alternatively, the external speaker 8 may not be provided. In this case, as shown in FIGS. 10A and 10B, the telephone communication speaker module SP includes a second telephone communication speaker 10 with a wide volume range, and the second telephone communication speaker 10 can also be used as an external speaker. Further, a notification sound output process shown in FIG. 11 is executed. When a predetermined notification sound is to be output during telephone communications, the control module 11 causes the second telephone communication speaker 10 to output the notification sound at low volume through a sound outlet 10a (S221). When a predetermined notification sound is to be output not during telephone communications, the control module 11 causes the second telephone communication speaker 10 to output the notification sound at high volume through the sound outlet 10a (S222).

In the modification example 2 of the first embodiment, the modification example of the second embodiment, and the third embodiment, operation keys in the key operation part 7 are assigned to the switch operation and the return operation. However, the present invention is not limited to this, but the control module 11 may display on the display surface 3 software keys assigned to the switch operation and the return operation.

The first to fourth embodiments may be combined as appropriate.

In the fourth embodiment, the proximity sensor 9 detects whether the user's ear contacts the cabinet 2. However, the present invention is not limited to this, but the touch panel in the touch detection module 14 may be used to detect whether the user's ear contacts the cabinet 2, for example. In this case, during telephone communications, any touch operation on the display surface 3 is disabled, and operation(s) related to telephone communications are performed from the key operation part 7.

Further, in the foregoing first to fourth embodiments, the present invention is applied to smart phone-type mobile telephones. However, the application of the present invention is not limited to this but the present invention may be applied to other types of mobile telephones such as a straight type, a folding type, and a slide type.

Moreover, the present invention is not limited to mobile telephones and can be applied to mobile terminal devices such as PDAs (personal digital assistants), tablet PCs, digital book terminals, or the like.

Besides, the embodiment of the present invention can be modified as appropriate in various manners within the scope of technical ideas disclosed in the claims.

What is claimed is:

1. A mobile terminal device, comprising:
a housing;
a telephone communication speaker which outputs sounds during telephone communications; and
a control module which controls output of the telephone communication speaker,
wherein
the telephone communication speaker includes:
a first speaker which releases sound waves corresponding to sounds to be output and vibration waves generated by vibrations of one surface of the housing according to vibrations corresponding to the sounds to be output, thereby to transfer the sounds; and
a second speaker which releases sound waves corresponding to sounds to be output, and
in case of execution of a function to output sounds from the telephone communication speaker,
when a predetermined trigger action is not made, the control module executes first control in which the first speaker outputs sounds but the second speaker does not output sounds, and
when the trigger action is made, the control module executes second control in which at least the second speaker outputs sounds.

2. The device according to claim 1, wherein it is determined that the trigger action is made when a sound with a predetermined attribute is output from the telephone communication speaker, and when the sound with a predetermined attribute is output, the control module executes the second control.

3. The device according to claim 2, wherein the sound with a predetermined attribute includes a predetermined notification sound, and when the predetermined notification sounds is output from the telephone communication speaker, the control module executes the second control.

4. The device according to claim 2, wherein the sound with a predetermined attribute includes a sound received from a predetermined communication partner, and when the sound received from the predetermined communication partner is output from the telephone communication speaker, the control module executes the second control.

5. The device according to claim 2, further comprising:
a second control switch operation module which accepts a switch operation from the second control to the first control, wherein when the switch operation from the second control to the first control is accepted during execution of the second control, the control module executes the first control instead of the second control.

6. The device according to claim 1, further comprising:
a first control switch operation module which accepts a switch operation from the first control to the second control, wherein it is determined that the trigger action is made when the switch operation from the first control to the second control is accepted, and when the switch operation from the first control to the second control is accepted, the control module executes the second control.

7. The device according to claim 1, further comprising:
a contact detection module which detects whether a detection target is in contact with the housing, wherein it is determined that the trigger action is made when the detection target is separated from the housing, and when the detection target is separated from the housing, the control module executes the second control.

8. A non-transitory storage medium holding a computer program for a mobile terminal device comprising: a housing; and a telephone communication speaker which outputs sounds during telephone communications, the telephone communication speaker including: a first speaker which releases sound waves corresponding to sounds to be output and vibration waves generated by vibrations of one surface of the housing according to vibrations corresponding to the sounds to be output, thereby to transfer the sounds; and a second speaker which releases sound waves corresponding to sounds to be output, wherein the computer program provides a computer of the mobile terminal device with a function to, in case of execution of a function to output sounds from the telephone communication speaker, when a predetermined trigger action is not made, execute first control in which the first speaker outputs sounds but the second speaker does not output sounds, and when the trigger action is made, execute second control in which at least the second speaker outputs sounds.

9. A sound output control method for a mobile terminal device comprising: a housing; and a telephone communication speaker which outputs sounds during telephone communications, the telephone communication speaker including: a first speaker which releases sound waves corresponding to sounds to be output and vibration waves generated by vibrations of one surface of the housing according to vibrations corresponding to the sounds to be output, thereby to transfer the sounds; and a second speaker which releases sound waves corresponding to sounds to be output, wherein the method comprises the steps of:
executing a function to output sounds from the telephone communication speaker; and
in case of execution of the function, when a predetermined trigger action is not made, executing first control in which the first speaker outputs sounds but the second speaker does not output sounds, and when the trigger action is made, executing second control in which at least the second speaker outputs sounds.

* * * * *